No. 862,314. PATENTED AUG. 6, 1907.
G. R. DECKER.
WATER HEATER AND PURIFIER.
APPLICATION FILED NOV. 20, 1905.
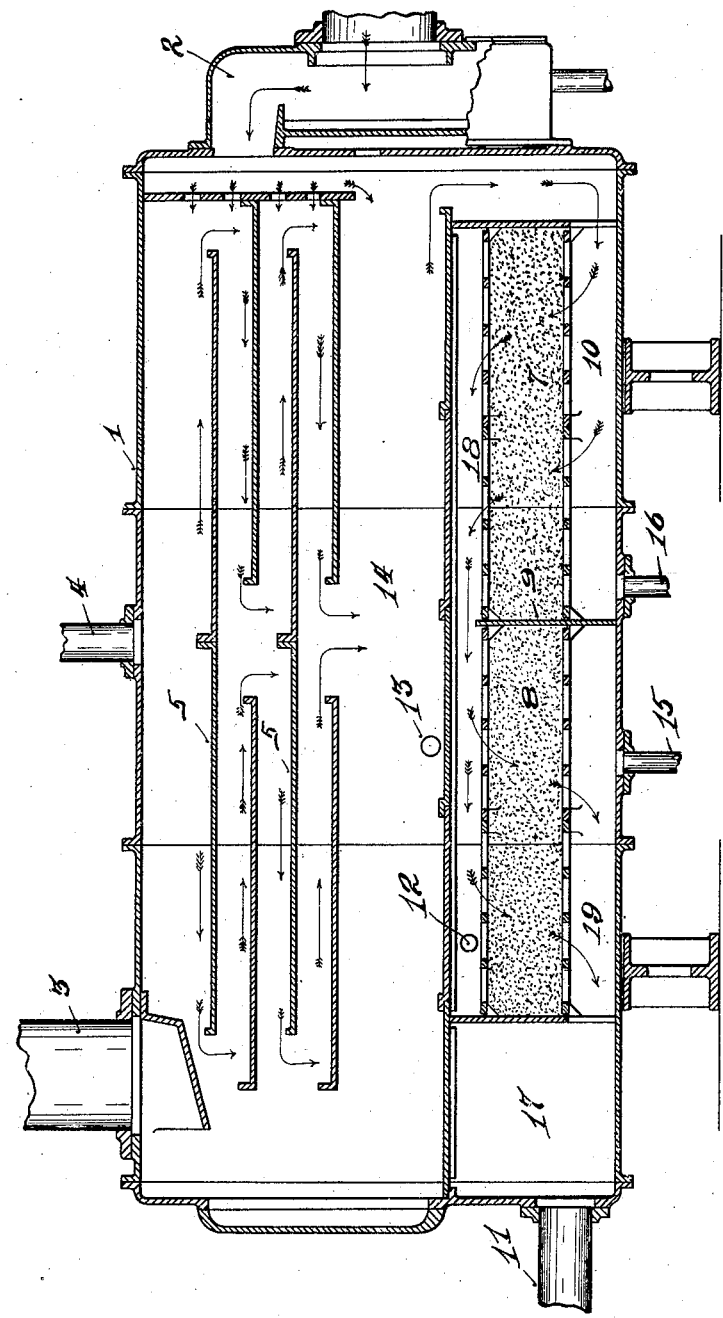

UNITED STATES PATENT OFFICE.

GEORGE R. DECKER, OF DAYTON, OHIO.

WATER HEATER AND PURIFIER.

No. 862,314.   Specification of Letters Patent.   Patented Aug. 6, 1907.

Application filed November 20, 1905. Serial No. 288,203.

*To all whom it may concern:*

Be it known that I, GEORGE R. DECKER, a citizen of the United States, residing at Dayton, in the county of Montgomery and State of Ohio, have invented certain new and useful Improvements in Water Heaters and Purifiers, of which the following is a specification.

My invention relates to an improved feed water heater and purifier, the object being to provide a simple and efficient apparatus having special provision for the separation of the oil from the water.

The features of the invention are more fully set forth in the description of the accompanying drawings, forming a part of this specification, in which:—the figure represents a central vertical section through my device.

1 represents the shell of the heater having the exhaust steam inlet 2 entering one end of the shell, and the outlet 3 leading from the top of the shell at the opposite end.

4 represents the feed water inlet entering the shell at the top.

5 represents a tier of overflow plates or pans suspended within the shell under the pipe 4. Under the pans 5 within the shell is a filter compartment containing two filters 7, 8, separated from one another by partition 9, but with water passages 10 so arranged that the water overflowing from the pans flows in opposite directions vertically through the two filters serially.

18 represents a passage leading from the filter 7 to the filter 8. 19 represents a passage leading from the filter 8 to the clear water chamber 17. Thus it will be seen that a water passage is formed above and below both filter chambers.

11 represents a feed water outlet.

12 represents an oil draw-off arranged in the top of the filter compartment.

13 represents a pipe for draining and cleaning the heating chamber 14.

15, 16, represent draining pipes for the filter.

In operation the feed water from the pipe 4 falling over the pans 5 in the usual manner takes a zigzag course represented by the arrows, which gives the greatest facility for intimately commingling with the current of steam flowing transversely through the water. In the preferred form, the water enters the first filter 7 from the bottom and rises to the top of the first filter passing over the partition 9 and flowing downward through the second filter 8 and into the clear water chamber 17. The oil and other matter of less specific gravity than water will not pass downward through the filter but will flow on top of the water, and can readily be collected and drawn off by the pipe 12 from the top of the filter compartment.

The arrangement of feed water heater and purifier herein shown and described readily effects the separation of the mineral impurities held in solution in the feed water, both of the light and heavy class. The minerals such as carbonate of lime, magnesia, etc., of heavier specific gravity than the water are deposited in the mud well 10, and are drawn off through the bore of pipe 16, the lighter impurities such as oil and other impurities of less specific gravity than the water are largely carried along by the current of water, passing through the first filter compartment and float in the water passage over both of the filters and may be drawn off through the pipe 12, thus effecting at one and the same time the purification of feed water upon both the lighter and heavier impurities which are set free during the passage through the filters.

Having described my invention, I claim:—

In a water heater and purifier, a shell divided by a horizontal partition into an upper and lower chamber, having communication at one side, a tier of horizontally arranged drip plates in said upper chamber, means for passing steam through said upper chamber, the lower chamber being divided by a vertical partition into two compartments communicating at one end of the partition, perforated filter bed holding plates in both of said vertical compartments, and an oil draw-off engaging through the side of the shell adjacent to one of the perforated filter plates, whereby the oil may be drawn off as an overflow while passing from one filter to the other.

In testimony whereof, I have hereunto set my hand.

GEORGE R. DECKER.

Witnesses:
 OLIVER B. KAISER,
 LUISE BECK.